United States Patent
Becker

(10) Patent No.: US 11,081,987 B2
(45) Date of Patent: Aug. 3, 2021

(54) POWER WAND AND METHOD OF USE

(71) Applicant: DOMETIC SWEDEN AB, Solna (SE)

(72) Inventor: Kent A. Becker, Huntertown, IN (US)

(73) Assignee: Dometic Sweden AB, Solna (SE)

( * ) Notice: Subject to any disclaimer, the term of this patent is extended or adjusted under 35 U.S.C. 154(b) by 148 days.

(21) Appl. No.: 15/354,463

(22) Filed: Nov. 17, 2016

(65) Prior Publication Data

US 2017/0264224 A1    Sep. 14, 2017

Related U.S. Application Data

(60) Provisional application No. 62/306,831, filed on Mar. 11, 2016.

(51) Int. Cl.

| | |
|---|---|
| E04F 10/02 | (2006.01) |
| H02P 7/03 | (2016.01) |
| E04F 10/06 | (2006.01) |
| E04H 15/08 | (2006.01) |
| E04H 15/44 | (2006.01) |

(52) U.S. Cl.
CPC ............ H02P 7/03 (2016.02); E04F 10/02 (2013.01); E04F 10/0614 (2013.01); E04F 10/0625 (2013.01); E04F 10/0666 (2013.01); E04H 15/08 (2013.01); E04H 15/44 (2013.01)

(58) Field of Classification Search
CPC ..... A47H 5/02; E06B 9/68; E06B 2009/6809; B25F 5/02; H02P 7/04; H02P 7/05; H02P 7/03; E04F 10/02; E04F 10/0614; E04F 10/0625; E04F 10/0666; E04H 15/08; E04H 15/44
USPC ........................................................ 160/310
See application file for complete search history.

(56) References Cited

U.S. PATENT DOCUMENTS

| | | | | |
|---|---|---|---|---|
| 2,715,843 A | * | 8/1955 | Clarke | .................... F16G 11/12 74/385 |
| 5,698,958 A | * | 12/1997 | Domel | .................... E06B 9/307 318/480 |
| 6,812,662 B1 | | 11/2004 | Walker | |
| D534,897 S | | 1/2007 | Bhakta | |
| 7,204,292 B2 | * | 4/2007 | Nien | ........................ E06B 9/74 160/168.1 R |
| D551,208 S | | 9/2007 | Yano | |
| D564,978 S | | 3/2008 | Koury et al. | |

(Continued)

FOREIGN PATENT DOCUMENTS

AU          201712804          5/2017

OTHER PUBLICATIONS

Transmittal Letter of Related Cases.
(Continued)

*Primary Examiner* — Daniel P Cahn
(74) *Attorney, Agent, or Firm* — Middleton Reutlinger

(57) ABSTRACT

Various embodiments of a power wand are provided. The power wand may be utilized with an awning assembly including a motor to power and direct rotation of the motor. Therefore, the power wand will electrically drive and direct extension and retraction of the awning assembly. The power wand may be a portable hand-held device which provides battery powered operation of the awning motor. The use of the wand therefore eliminates the connection of awning wiring to the electrical system of the recreational vehicle (RV) or other mobile or fixed structure to which the awning may be mounted.

17 Claims, 11 Drawing Sheets

(56) References Cited

U.S. PATENT DOCUMENTS

| | | | |
|---|---|---|---|
| D573,134 S | 7/2008 | Milks et al. | |
| 7,557,534 B2* | 7/2009 | Uehlein-Proctor | B25F 5/02 320/107 |
| D653,652 S | 2/2012 | Kroyer | |
| D664,947 S | 8/2012 | Choi et al. | |
| D672,333 S | 12/2012 | Lin et al. | |
| D686,192 S | 7/2013 | Widner et al. | |
| D687,416 S | 8/2013 | Lee et al. | |
| D698,338 S | 1/2014 | Ingham et al. | |
| D718,750 S | 12/2014 | Young et al. | |
| 9,047,758 B2* | 6/2015 | Robinson | G08C 23/04 |
| D737,250 S | 8/2015 | Ingham et al. | |
| 9,153,986 B1* | 10/2015 | Herr | H02J 7/0044 |
| 9,228,359 B2* | 1/2016 | Taylor | E04F 10/0648 |
| D749,509 S | 2/2016 | Blau | |
| D797,060 S | 9/2017 | Pham et al. | |
| D893,436 S | 8/2020 | Becker | |
| 2004/0035535 A1* | 2/2004 | Petrongolo | E06B 9/76 160/310 |
| 2004/0063457 A1* | 4/2004 | Kim | H01M 2/1022 455/550.1 |
| 2004/0103995 A1* | 6/2004 | Nien | E06B 9/322 160/170 |
| 2004/0257035 A1* | 12/2004 | Chang | F21L 4/005 320/107 |
| 2005/0034374 A1 | 2/2005 | Ebbe et al. | |
| 2006/0267548 A1* | 11/2006 | Uehlein-Proctor | H02J 7/0045 320/107 |
| 2011/0108538 A1* | 5/2011 | Gray | H05B 1/0272 219/211 |
| 2011/0214302 A1* | 9/2011 | Inayoshi | B25F 5/02 30/371 |
| 2012/0073616 A1* | 3/2012 | Kuelbs | A45B 3/00 135/16 |
| 2012/0193035 A1* | 8/2012 | Malekpour | E06B 9/36 160/5 |
| 2013/0031762 A1* | 2/2013 | Chellew | B25F 5/02 29/426.5 |
| 2014/0076508 A1* | 3/2014 | Mullet | E06B 9/72 160/310 |
| 2014/0161513 A1* | 6/2014 | Chellew | B25F 5/00 403/322.1 |
| 2014/0224437 A1* | 8/2014 | Colson | E06B 9/42 160/291 |
| 2014/0311686 A1* | 10/2014 | Yu | E06B 9/68 160/84.02 |
| 2015/0028797 A1* | 1/2015 | Miller | H02J 7/0042 320/103 |
| 2015/0041078 A1* | 2/2015 | Perache | A47H 1/04 160/331 |
| 2015/0107788 A1* | 4/2015 | Mullet | A47H 1/02 160/405 |
| 2015/0191970 A1* | 7/2015 | Yu | E06B 9/262 160/84.02 |
| 2015/0318581 A1* | 11/2015 | Johnson | H01M 10/4257 429/7 |
| 2015/0330086 A1* | 11/2015 | Taylor | E04F 10/0648 160/69 |
| 2015/0344125 A1 | 12/2015 | Petiot et al. | |
| 2016/0143470 A1* | 5/2016 | Mullet | A47H 1/102 160/331 |
| 2016/0168906 A1* | 6/2016 | Mullet | E06B 9/322 700/275 |
| 2017/0000280 A1* | 1/2017 | Mullet | E06B 9/68 |
| 2017/0191311 A1* | 7/2017 | Mullet | E06B 9/368 |
| 2018/0163465 A1* | 6/2018 | Biedermann | E06B 9/50 |
| 2019/0040676 A1* | 2/2019 | Mullet | E06B 9/322 |

OTHER PUBLICATIONS

Canadian Intellectual Property Office; Canadian Patent Application No. 2,948,710 entitled "Power Wand and Method of Use" filed on Nov. 17, 2016.

United States Patent and Trademark Office; Design U.S. Appl. No. 29/584,841 entitled "Power Wand" filed Nov. 17, 2016.

Canadian Intellectual Property Office; Canadian Design Patent Application No. [TBD] entitled "Power Wand" filed on May 8, 2017.

Canadian Intellectual Property Office, Canadian Divisional App. No. 179312 filed Jan. 22, 2018.

Australian Patent Office; Australian Design Patent Application No. 201712804 entitled "Power Wand for Awning" filed May 10, 2017.

Canadian Intellectual Property Office; Canadian Design Patent Application No. 174706 entitled "Power Wand" filed on May 10, 2017.

Notice of Allowance issued in Design U.S. Appl. No. 29/643,437, filed Oct. 8, 2019.

Examiner's Report issued in CA Application No. 174706 dated Nov. 14, 2017.

Requirement for Restriction/Election issued in U.S. Appl. No. 29/584,841 dated Nov. 30, 2017.

Non-Final Office Action issued in U.S. Appl. No. 29/584,841 dated May 7, 2018.

Notice of Allowance issued in U.S. Appl. No. 29/584,841 dated Nov. 21, 2018.

Non-Final Office Action issued in U.S. Appl. No. 29/643,437 dated Dec. 21, 2018.

Corrected Notice of Allowability issued in U.S. Appl. No. 29/584,841 dated Jan. 9, 2019.

Notice of Allowance issued in U.S. Appl. No. 29/643,437 dated Jul. 30, 2019.

Design U.S. Appl. No. 29/643,437 entlitled "Power Wand" filed Apr. 9, 2018.

Design U.S. Appl. No. 62/306,831 entlitled "Power Wand and Method of Use" filed Mar. 11, 2016.

Notice of Allowance issued in Design U.S. Appl. No. 29/643,437, filed Feb. 20, 2020.

Notice of Allowance issued in Design U.S. Appl. No. 29/643,437 dated Jul. 6, 2020.

* cited by examiner

POWER WAND AND METHOD OF USE

CROSS REFERENCE TO RELATED APPLICATION

This non-provisional patent application claims priority to and benefit of, under 35 U.S.C. § 119(e), U.S. Provisional Patent Application Ser. No. 62/306,831, filed Mar. 11, 2016 and titled "Power Wand and Method of Use", all of which is incorporated by reference herein.

BACKGROUND

1. Field of the Invention

Present embodiments relate to a hand-held power wand for directing and power movement of an awning assembly. More specifically, present embodiments relate to a hand-held power wand which may be connected or disconnected for purpose of powering and directing movement of an awning assembly.

2. Description of the Related Art

Power awnings are typically installed as an original equipment manufacturer (OEM) product. This is due to the general need to connect the awning motor to the recreational vehicle (RV) power system. Heretofore, due to the complexity of such connection, it has been more suitable to provide the installation of the power awning by the OEM.

With this in mind, one can understand therefore that aftermarket sales of power awnings are limited. End users either do not have the experience to connect wiring systems or harnesses of the awning with wiring systems or harnesses of the RV. Alternatively, needing a complicated electrical installation adds cost to the end user above and beyond the costs for the materials.

It would be desirable to provide a power awning which can be easily installed in an aftermarket manner and therefore decrease the need for OEM installation. It would be desirable to provide an awning assembly which does not require an OEM provider to drill holes in the RV or building structure in order to route wiring to existing RV or building power wiring or electrical systems.

The information included in this Background section of the specification, including any references cited herein and any description or discussion thereof, is included for technical reference purposes only and is not to be regarded subject matter by which the scope of the invention is to be bound.

SUMMARY

Present embodiments are related to a portable hand-held power wand which allows for installation of a power awning in aftermarket fashion and powering of the awning motor by way of the power wand. The power wand may be electrically connected to a connector associated with wiring for the awning assembly. Further, the power wand may be easily connected and disconnected once the awning assembly is moved to a desirable position. The wiring for the awning assembly may be routed in such a manner as not to require drilling of holes into and through the RV or building.

According to some embodiments, a power wand comprises a housing, a battery pack which engages the housing, at least one battery disposed within the battery pack, wiring in electrical communication with the at least one battery, the wiring extending from the housing, a connector at an opposite end of the wiring capable of being connected to an awning assembly to drive extension or retraction, and, a switch on the housing to actuate the awning assembly.

Optionally, the connector capable of electrical communication with an awning motor. The power wand may further comprise a strain relief extending from the housing. The wiring extending through the strain relief. The at least one battery may be removable from the housing.

The switch may define a direction control for an awning motor. The at least one battery may be a rechargeable battery. The power wand may further comprise a connector for recharging in the rechargeable battery. The at least one battery may be a non-rechargeable battery. The power wand may further comprise a connector for powering the power wand.

According to some embodiments, a power wand comprises a housing having a handle, a battery pack engaging the housing, at least one rechargeable battery located in the battery pack, wiring in electrical communication with the battery pack and extending from the housing, a connector on the wiring and in electrical communication with at least one battery, a switch in electrical communication with the battery to drive an awning motor which is electrically communicating with the connector.

Optionally, the connector may be an electrical quick connector. The connector may be spaced from the housing. For example, the connector may be spaced by the wiring. The power wand may further comprise a strain relief extending from the housing.

In some embodiments, a method of powering an awning assembly comprises positioning a power wand near the awning assembly, connecting a power connector of the power wand to an awning assembly, powering an awning motor from the power wand, and directing movement of the awning motor with the power wand.

Optionally, the method may further comprise grasping the elongate power wand. The method may further comprise actuating a switch to drive the awning motor. The method may further comprise removing the at least one battery. The method may further comprise disconnecting the power wand from the awning assembly when the directing movement is complete.

According to still further embodiments, an awning assembly comprises a hardware assembly which includes at least one arm that extends and retracts with an awning canopy, an awning motor which is in electrical communication with an awning power connector located on or adjacent to the hardware assembly, the awning power connector capable of connection to a hand-held battery powered power wand to power and direct operation of the awning assembly.

Optionally, the awning assembly may include at least one accessory. The awning assembly may further comprise a second switch to power the at least one accessory. The at least one accessory may be an LED strip, a spotlight, a fan, a speaker or a combination thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a power wand will now be described by way of examples. These embodiments are not to limit the scope of the claims as other embodiments of the power wand will become apparent to one having ordinary skill in the art upon reading the instant description. Non-limiting examples of the present embodiments are shown in figures wherein:

DETAILED DESCRIPTION

Figure 1:
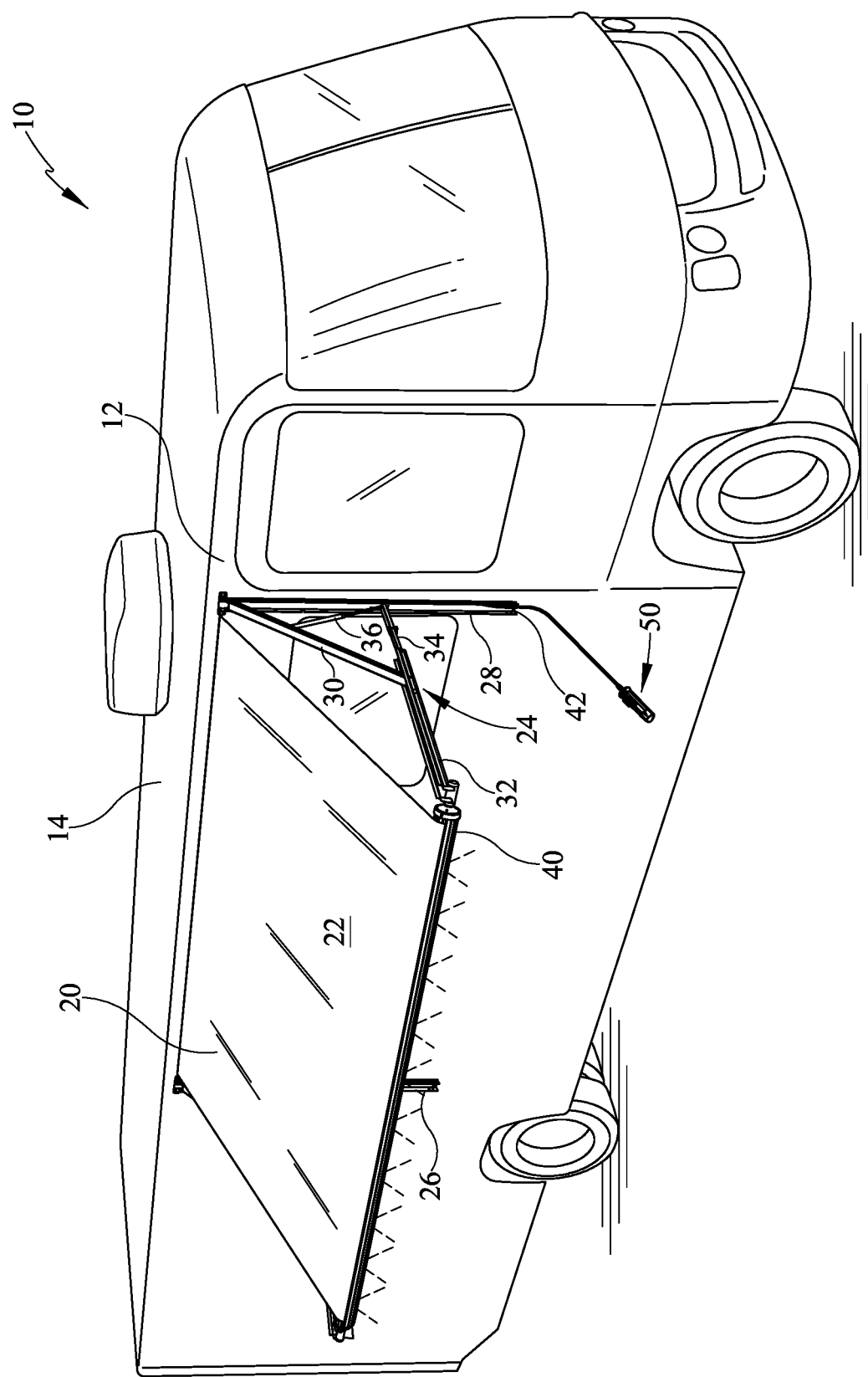
FIG. 1 is a perspective view of a recreational vehicle with awning assembly in an extended position with the portable hand-held power wand connected for power and driving direction of the awning assembly.

It is to be understood that the power wand is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-11 various embodiments of a power wand. The power wand may be utilized with an awning assembly including a motor to power and direct rotation of the motor. Therefore, the power wand will electrically drive and direct extension and retraction of the awning assembly. The power wand may be a portable hand-held device which provides battery powered operation of the awning motor. The use of the wand therefore eliminates the connection of awning wiring to the electrical system of the recreational vehicle (RV) or other mobile or fixed structure to which the awning may be mounted.

Referring now to FIG. 1, a perspective view of a recreational vehicle (RV) 10 is depicted. The exemplary RV includes a drive and a transmission, not shown, as well as at least one sidewall 12 and a roof 14. It should be understood that although an RV 10 is referred to in the exemplary embodiments, one skilled in the art should understand that the use of the power wand is not limited to these drivable vehicles. The term "RV" is also meant to include towable structures, sometimes called campers, homes and other stationary structures as well as boats or other marine applications, for example which use canopy structures which may or may not be retractable, commercial vehicles, agricultural vehicles, horse trailers, and temporary structures such as those used at sports events, (tailgating), flea markets. All of these structures are considered to be usable with the awning assembly of the present embodiments.

An awning assembly 20 is connected to the sidewall 12 and/or the roof 14 of the vehicle 10. In other embodiments, the awning assembly 20 may be retractable within the sidewall 12 so as to reduce the airflow interference of the awning assembly 20 while the vehicle 10 is being operated. The awning assembly 20 may be defined by various structures such as roller type awning, cassette awning or other types. The awning assembly 20 may also be a manually operated awning or may be an automated awning.

The awning assembly 20 includes an awning or canopy 22 and hardware assembly 24 defined by at least one first arm 28 and at least one second arm 30. The awning hardware assembly 24 is utilized, according to the instant embodiment, to connect the awning assembly 20 to the sidewall 12 of the vehicle 10 or other structure. The hardware assembly 24 allows for support of the canopy 22 in an extended position (shown) or in a retracted position. The hardware assembly or hardware 24 supports a movable awning bar 40. The awning bar 40 may be embodied by a roller tube in some embodiments which rotates to either extend or retract the awning canopy 22 or a non-rotating bar of circular or non-circular cross-section. Optionally, the hardware assembly 24 may also provide a pathway for wiring from a power source to the awning bar 40 to drive a motor or alternatively, for example may be routed through a hem in the canopy 22. Other wiring pathways may also be used however.

The awning bar 40 may be circular in cross-sectional shape in some embodiments. The awning bar 40, depicted as a roller tube may include a first end and a second end with end caps. The awning bar 40 may be supported at or near ends to allow rotation for extension and retraction of the awning canopy 22. However, as will be described further, the present embodiments need not be limited to roller tube embodiments, as other types of awnings may be utilized.

Figure 11:
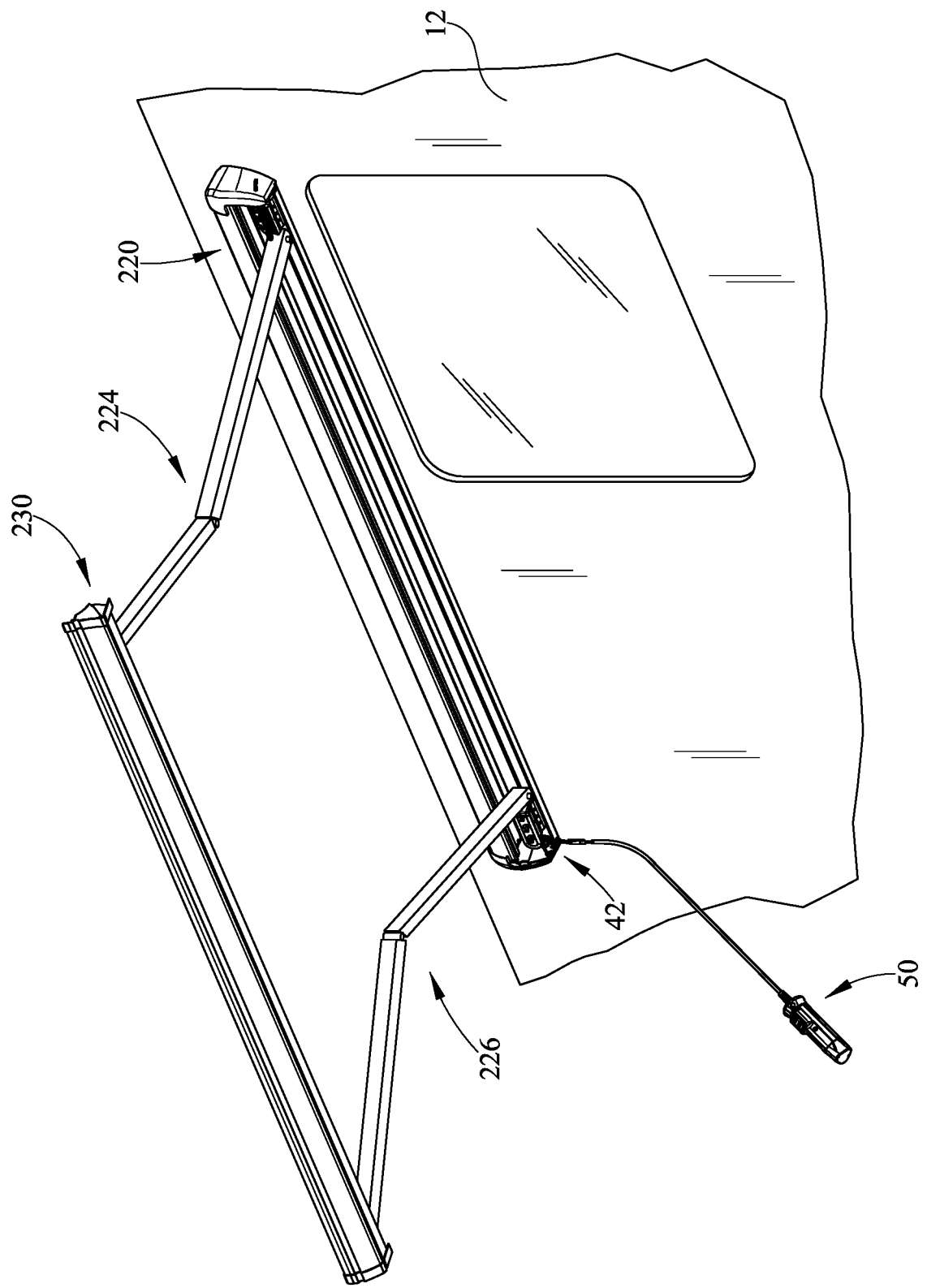

The awning assembly 20 is exemplary and other variations may be utilized. For example, according to one exemplary embodiment, a cassette style awning assembly (FIG. 11) may be used having an awning bar 230 which moves toward or away from the RV 10. Further, an awning bar 40 may be mounted to rotate at the RV sidewall 12 rather than be movable toward and away from the RV sidewall. Also, the awning bar 40 may be movable as shown, or may be fixed to the sidewall 12 so that the canopy extends with a non-rolling bar, such as in a cassette awning arrangement (FIG. 11).

Referring still to FIG. 1, the awning assembly 20 includes the awning canopy 22 and first and second hardware assemblies 24 and 26 (not shown in this view). In this embodiment, each of the hardware assemblies are formed the same and therefore only hardware 24 will be described. However, these hardware assemblies 24, 26 may be different and may also be embodied in differing forms from that which is depicted. The hardware assembly 24 supports the canopy 22 in the extended position (shown) and collapses to a compact, nested stack arrangement when the awning assembly 20 is retracted for road travel or when weather conditions preclude extended use of the awning assembly 20. In the retracted position, the hardware assemblies 24, 26 are generally positioned in a vertical arrangement near lateral edges of the canopy 22 and along sidewall 12 of the RV 10. In the extended position depicted, portions of the hardware assemblies 24, 26 extend outwardly from the RV sidewall 12.

The hardware assembly 24 may include a plurality of arms 28, 30, 32, 34 defining a four bar linkage comprising a first base arm 28, a second top arm 30, a third extending arm 32 and a fourth adjustable arm 34 which may allow for pitch adjustment. The hardware assemblies 24, 26 may be formed of one or more supports including a first arm 28 which is mounted to the sidewall 12 (FIG. 1). The second arm 30 extends from the first arm 28. In the exemplary embodiment, the second arm 30 may extend from the upper end, however this is not limiting and merely one example of a configuration which may be utilized. The second arm 30 may be pivotally connected to the first arm 28 and may be further sized so as to be nested in a nested arrangement with either or both of the first arm 28 and a third arm 32 which may be pivotally connected to an opposite end of the second arm 30 and spaced from the first arm 28. One or more struts 36 may be utilized to control movement of the second and third arms 30, 32. Additionally, an adjustable arm 34 may be utilized to position and adjust the extended configuration of the awning hardware assemblies 24, 26.

The weight of the awning assembly 20 in an extended position may cause one or more members of the hardware, for example strut 36 or arm 34, to vary in size, and result in the awning sagging.

The first base arm 28 is connected to the RV sidewall 12 and is channel-shaped having an open top which is capable of receiving a nested storage of the additional arms described in the following description of the hardware assembly 24. The first base arm 28 may be of a length so as to receive the additional arms in a compact nested arrangement so that those additional linkage arms do not extend from the bottom end of the first base arm 28. The channel shape is generally u-shaped and may have squared corners or rounded corners. Other shapes however may be utilized.

The first base arm 28 may be straight and elongated and may be formed in various manners, including but not limited to an extrusion process. The first base arm 28 may be formed of a high-strength, lightweight material such as aluminum or aluminum alloy, among other materials. The channel shape comprises a main wall, a first side wall, and a second side wall defining the channel. The channel opening is outwardly facing so that the channel may receive the additional assembly arms when the awning assembly 20 is retracted.

Figure 8:
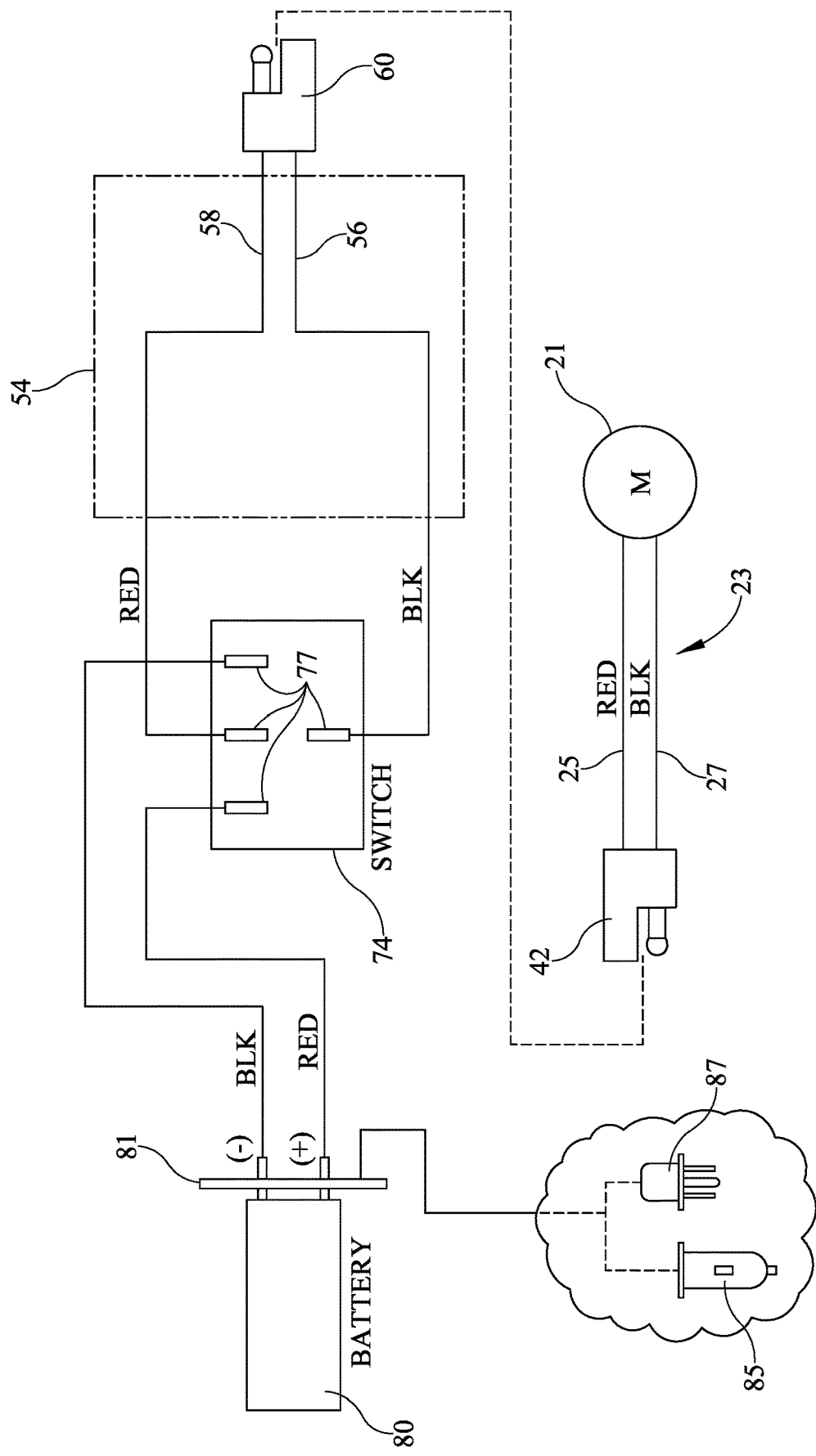
FIG. 8 is a schematic diagram depicting the electrical components of the power wand and the awning assembly; and, FIG. 9 is a flow chart of a method of using the power wand.
Figure 10:
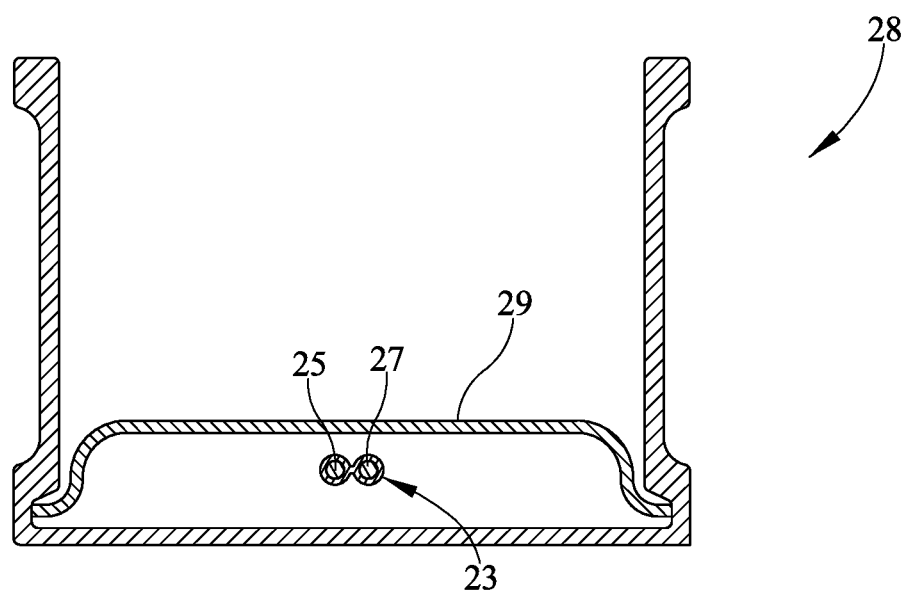
FIG. 10 is a cross-sectional view of one hardware structure for running wiring through the awning hardware; and, FIG. 11 is a perspective view of an alternative awning assembly comprising a cassette awning.

With reference to FIG. 10 briefly, a representative sectional drawing of a portion of the awning hardware 24, 26 is shown. In the example depicted, the awning arm 28 is represented and has a generally channel shape. As noted, the channel shape may be used for various reason including, but not limited to, the nesting of the hardware arms. The awning arm 28 may also include a false floor 29 providing a route wherein the wiring 23, including conductors 25, 27 for the awning motor 21 (FIG. 8). The false floor 29 may be formed integrally or may be removable from the first arm 28. As the wiring 23 for the motor 21 (FIG. 8) may be routed within the first arm 28, and since it is desirable to inhibit damage to such wiring, the wiring 23 may be run beneath the false floor 29 without damaging of the due to the movement of the other arms in this area. Further, while the wiring 23 is shown generally centered in the awning arm 28, it may be alternatively moved to a different location and further may or may not be retained by wire guides or other retaining structures, to set position or otherwise limit movement in the arm 28. Thus the second arm 30 and third arm 32 may be nested in the first arm 28 and the wiring be clear of those moving components of the awning assembly 20. Other methods of routing the wiring may be utilized including cable ties or other features to retain the wiring in such a way that it is not inhibiting movement of other components of the awning assembly while also providing power to the awning motor 21 (FIG. 8).

Referring again to FIG. 1, the second arm 30 is pivotally connected to the first base arm 28 and extends at a second end to a third extended arm 32. The top arm 30 may also be formed of a high-strength, lightweight material such as aluminum alloy and may be formed in various fashions including, but not limited to, an extrusion process. The wiring may follow this routing through the second arm 30 and through the third arm 32.

Extending outwardly from the first base arm 28 is the adjustable arm 34 which may allow adjustment of awning pitch, and the third extended arm 32. The third adjustable arm 32 may also be formed in various shapes including, but not limited to, a channel shape.

The adjustable arm 34 extends from the base arm 28 and provides the capability to raise or lower corners of the awning assembly 20 disposed away from the RV sidewall 12. This adjustment of the corners allows independent raising or lowering of either end of the awning bar 30. Each adjustable arm 34 includes a first member and a second member which slide relative to one another to adjust total length. Therefore, each adjustable arm 34 may be adjusted to move and may be adjusted between an extended position and a collapsed position. Although the depicted embodiment provides for manual adjustment, it is contemplated that other mechanisms may be provided to provide automated adjustment. A lock or clamp may be provided to limit relative motion between the members when the adjustable arm 34 is set at a desired configuration. The locked or secure position may be engaged, for example when extended, collapsed, or any position there between. Additionally, the unlocked position allows for manual adjustment to a desired configuration, at which time the lock may be engaged. The lock may be embodied by a lock knob, clamp, fastener-nut, latch, other movement limiting structure or combinations thereof. While an adjustment arm 34 is described, which is shown to have pitch adjustment capability for the awning bar 40, one of ordinary skill in the art may recognize that various other adjustable functions may be provided by adjustable arm 34. Therefore, the adjustment arm 34 should not be considered solely limited to pitch adjustment. Still further, arm 34 may alternatively be defined in a rigid construction.

The first and second members of the arm 34 are slidable in an axial direction of the members relative to one another. Similarly, the members may be retracted to vary the pitch of the awning assembly 20 and the canopy 22. This functionality may also be provided at the opposite hardware assembly 26 so that the pitch of the canopy 22 may be changed to allow for drainage, for example, or allow of uneven deployment or retraction of the awning assembly 20. Once a desired position is achieved, in the extended configuration, the adjustable arm 34 may be locked in various manners, for example a knob-lock assembly or other fastening structure.

The hardware assembly 24 may further comprise the strut 36 which extends between the first base arm 28 and a second top arm 30. The strut 36 supports the second top arm 30 when the awning assembly 20 is in an extended or deployed position. The strut 36 further provides damping force for example, in windy conditions or during heavy rains. The strut 36 may be a gas strut, fluid strut or other suitable structure wherein the inner end of the strut 36 is connected to the base arm 28 and the outer end connects to the second top arm 30. The strut 36 may be provided with pivoting joints, such as pivotable ball end joints, or other connectors so that the strut 36 pivots and may be received within the base arm 28 when the awning assembly 20 is retracted. The joints or ends of the strut 36 may connect to a mounting bracket or other similar structure which is connected to the base arm 28 by various types of fasteners including, but not limited to, rivets or screws.

The strut 36 applies a force on the awning assembly 20 to provide an opposed force to any force which may be applied by water collecting on the canopy 22 or alternatively, wind blowing against the canopy 22. For example, the strut 36 may also allow a corner of the awning assembly 20 to lower if the adjustable arm 34 is unlocked or unsecured. Alternatively, when the loading of the water or wind is gone, the strut 36 allows the awning assembly 20 to return the lowered corner into the desired position. While one example of an awning assembly is embodied by the depicted roller tube and hardware, other types of awnings may be utilized.

Referring still to FIG. 1, an awning power connector 42 is shown near the lower end of the first arm 28 of the hardware assembly 24. The connector may be in a vertical plane or a horizontal plane or some angle therebetween. In the instant embodiment, the awning power connector 42 is disposed facing downward and located in a horizontal plane. The connector 42 is located at or near a lower end of the hardware 24 for ease of access to the user at an end of the first arm 28, allowing easy routing of wiring through the first arm 28. The awning power connector 42 is shown adjacent to the hardware assembly 24 but may be incorporated in some embodiments into the hardware assembly 24. For example, the first arm 28 may be extended slightly to provide enough space for positioning of the awning power connector 42 near the lower most end without interfering with the movement of the remaining arms of the hardware assembly 24 in or near the retracted position. The awning power connector 42 may include at least two power conductors which extend from the connector 42 to the awning motor 21 of the awning assembly 20. While the connector is shown near the bottom of the awning arm 28, the awning power connector 42 may also be moved to alternate locations. However, it is desirable to maintain the ease of installation in such manner that a limited number of holes or cuts to the RV structure need to be made in performing the installation of the wiring.

A power wand 50 is also shown in FIG. 1 and connected to the awning power connector 42. The power wand 50 provides several functions. The power wand 50 includes a power component such as, for example by way of rechargeable battery to provide power through the awning power connector 42 to an awning motor 21 of the awning assembly 20. Further, the power wand 50 provides direction control for the movement of the awning motor 21 and therefore in either extension or retraction of the awning assembly 20. Further, the power wand 50 allows for easy connection and disconnection from the awning assembly 20 and therefore, ease of use without requiring difficult installation techniques associated with routing control and power wiring from the awning motor 21 to the electrical system of the RV, other mobile structure or fixed structure.

Referring briefly to FIG. 11, an alternative style of awning assembly is shown comprising the cassette awning 220. The cassette awning 220 has an awning bar 230 which does not roll to extend away from the sidewall 12, as in the previous embodiment. A fixed roller position may be utilized at the sidewall 12, however. The awning hardware 224, 226 also differs in that the hardware arms pivot to an extended position at the sidewall 12, at the awning bar 230 and at an intermediate position.

As further depicted in the figure, the awning power connector 42 may be located at a higher position. In such embodiment, the installation will not require drilling of holes to route wiring to a lower position. However, it may be understood that positioning of the awning power connector 42 may be provided at a lower position, which is easier for a user to access. Or in the alternative, an arm may extend downwardly from the awning assembly 220 to allow for routing and concealment of wiring without requiring internal routing of the wiring to the awning motor. As depicted, the power wand 50 may be connected for driving operation of the awning assembly 220 between extended and retracted positions.

Also shown in FIG. 1, beneath the awning bar 40 is exemplary illumination. The illumination is representative of multiple accessories which may be utilized. For example, the accessories may be embodied by LED strip, one or more spotlights, fans or audio speakers, for example. The power wand 50 may also be used to power these accessories for example.

Figure 2:
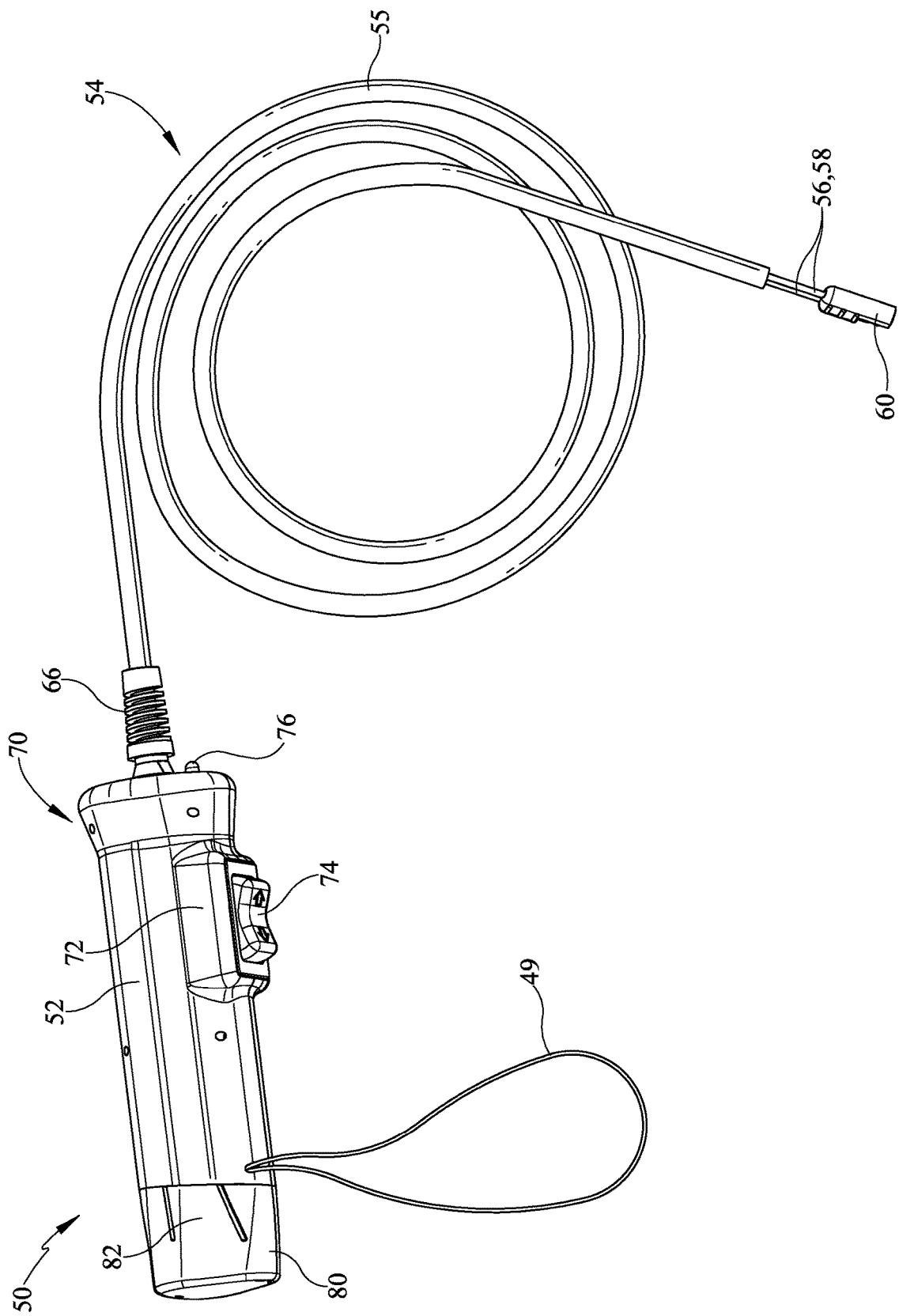
FIG. 2 is a perspective view of an exemplary power wand in a first coiled position.

Referring now to FIG. 2, a perspective view of the power wand 50 is shown. In this view, the power wand 50 is shown having a housing 52 and wiring 54. The wiring 54 may be formed of a flexible cable jacket 55 or may be of a more rigid jacket or conduit material if the wiring 54 is of a shorter length for example. Within the wiring jacket 55 are at least first and second conductors 56, 58. The conductors 56, 58 carry power from the housing 52 to a connector 60 which is an easily connectable structure for connection with the awning power connector 42 (FIG. 1). The conductors 56, 58 correspond to a positive and negative connection with batteries or a capacitor within the housing 52. The connector 60 is, in some embodiments, a two place, two pole connector including a positive and negative connection corresponding to the conductors 56, 58.

As shown in the instant embodiment, the wiring 54, including the jacket 55 and the conductor 56, 58, is flexible and may be wound for easy storage.

At an end of the wiring 54 opposite from the connector 60, is a strain relief 66. The strain relief 66 may be molded into the housing 52 or may be formed independently from the housing 52 and the wiring 54 or may be formed integrally with the wiring 54. In either event, the wiring 54 passes through the strain relief 66 to relieve bending or strain on the conduit 54 and conductors 56, 58 therein. The conductors 56, 58 extend through the housing 52 for electrical connection to a switch 74 and a battery or battery pack within the housing 52.

The housing 52 includes an enlarged hand hold 70 at a forward end of the structure. The hand hold 70 is enlarged to aid in gripping the power wand 50, specifically the housing 52 and provides a visible location for a user to position their hand while providing the user a positive structure to feel so as to locate fingers and also not lose grip or hold on the housing 52. Extending from the enlarged hand hold 70 of the housing 52, the housing 52 may have various cross-sectional shapes. In the instant embodiment, the housing 52 generally is of a triangular cross-section and may include curved corners where the sides intersect. However, the housing 52 may alternatively have other cross-sectional shapes and therefore the example embodiment of the triangular cross-section should not be considered as limiting.

Referring still to the housing 52, a switch mount 72 is shown with a switch 74 thereon. The switch mount 72 is shown extending from the housing 52 near an intersection of two sides of the housing triangular shape and the switch mount 72 generally has a rectangular top surface shape wherein the switch 74 is located.

The switch 74 according to some embodiments may be a double pole switch, double throw switch. For example, the switch 74 may be a normally centered position switch which is polarity reversing such that when the switch is actuated in a first direction, the power wand 50 causes the awning motor 21 to rotate in a first direction. When the switch 74 is actuated in a second direction, polarity is reversed so that the motor 21 (FIG. 8) rotates in a second opposite direction to the first direction. Thus, the power wand 50 when connected to the awning assembly 20 provides electrical power for the awning motor 21, as well as provides direction control of the motor rotation and therefore, extension and retraction for the awning assembly 20.

Extending from the housing 52, may also be an LED 76 which may be used to illuminate the awning power connector 42. In the instant embodiment, the LED 76 is depicted at the forward end of the hand hold 70. In such a way, the switch 74 may be depressed to illuminate the LED 76 so that the user can clearly see where the awing power connector 42 is to aid in plugging in the connector 60. The LED 76 may be actuated by the switch 74 or an alternative light switch may be provided on the housing to provide such functionality.

At the opposite end of the housing 52 from the strain relief 66 is a removable battery pack 80. The battery pack 80 includes a detent 82 which engages the housing 52 and may be depressed to disengage from the housing 52 and allow removal of the battery pack 80. Once removed, the battery pack 80 may be placed into a recharging stand or station and the batteries charged to a suitable level to allow for actuation of the awning assembly 20. Alternatively, other structures may be use to retain the battery pack 80 in position. For example, fasteners may be used to retain the battery pack 80 in position. Still further, the housing may include a compartment for positioning of batteries of a battery pack that is completely enclosed, rather than the battery pack extending from the housing. Still further, any of the preceding embodiments may be utilized with the addition of a charging connector or plug which may charge the battery or battery pack in position in or connected to the housing, for example a charging stand, and so that the battery or battery pack need not be removed from the housing.

The housing 52 also defines a grip portion where a user's hand may be placed during operation. Further, while not shown, a soft cover may be utilized on the housing 52 in order to aid in gripping the housing 52 and holding the housing during operation. The cover may be formed of a soft overmold or rubber-like material, or other materials which aid in the user's holding of the housing 52. The housing 52 may also comprise a wrist strap 49 which allows the user to place around the wrist and aids in holding the housing 52 or more specifically, not dropping the housing 52 if such slips. Still further, the wrist strap 49 may be used to hang the power wand 50 once the device is finished for use and needs to be stored.

Figure 3:
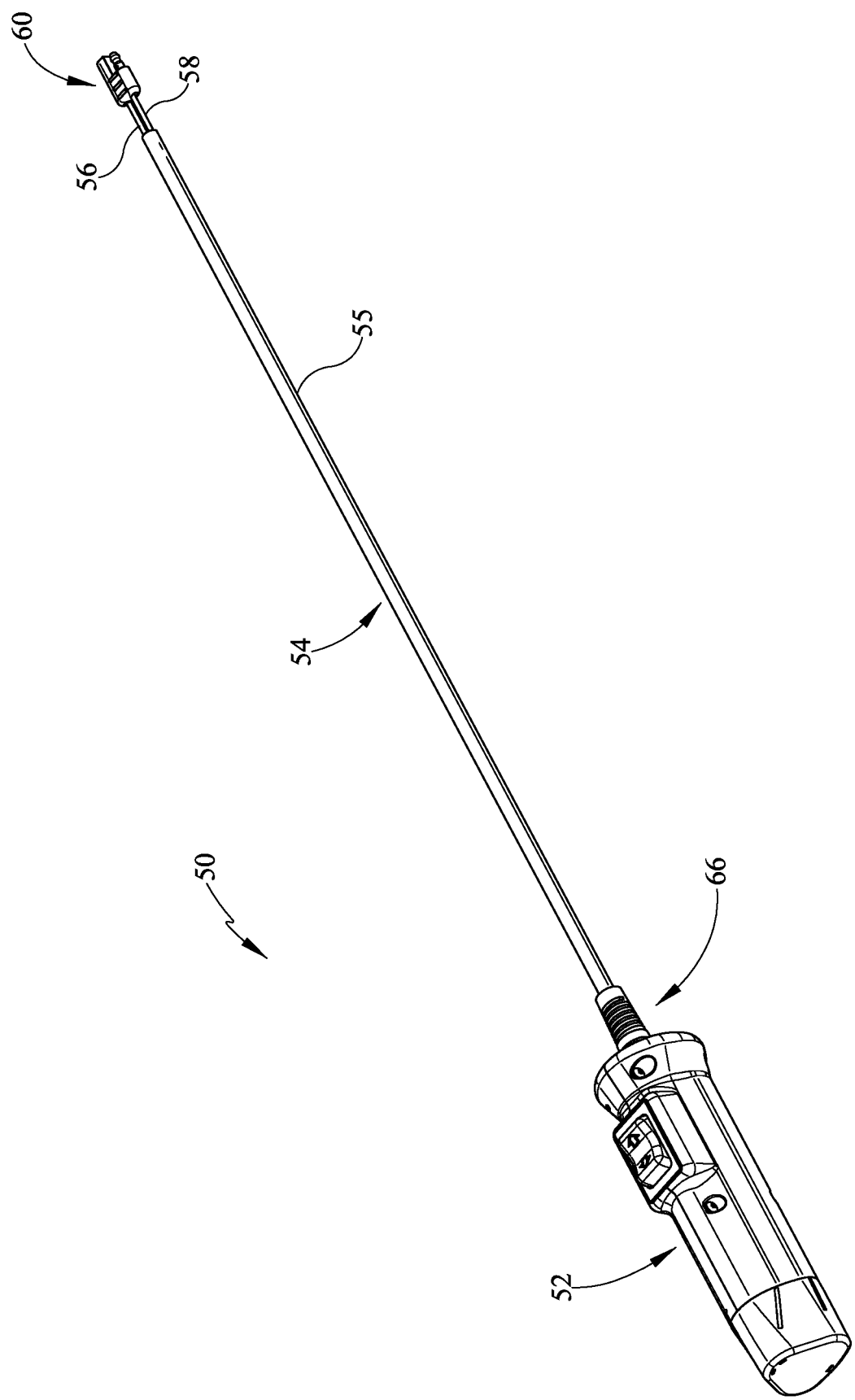
FIG. 3 is a perspective view of the exemplary power wand in a second extended position.

Referring now to FIG. 3, the power wand 50 is shown in a perspective view. As previously indicated, the power wand 50 is defined by the housing 52 and the wiring 54. The wiring 54 includes conductors 56, 58 and a connector 60 at an end opposite the housing 52. In this embodiment, the wiring 54 is extended as opposed to the configuration shown in FIG. 2. As discussed earlier, the wiring 54 may include a flexible material or the jacket 55 may be formed of a rigid conduit-like material. Such rigid construction may be desirable if the wiring 54 is of a shorter length. Further, the wiring jacket 55 may be formed of a memory type material which may be extended with force but returns to a coiled position upon removal of such force.

While the wiring 54 is partially shortened to reveal the conductors 56, 58, one skilled in the art may realize that the wiring 54 may extend all the way to or closer to the connector 60 so that the conductors 56, 58 are more thoroughly covered and are less likely to break accidentally. For example, a strain relief structure 66 may be utilized between the connector 60 and the jacket 55 or a hard conduit if utilized. The wiring 54 may be of various lengths which may make connection and monitoring of the awning assembly movement more easily performed by the user.

Figure 4:
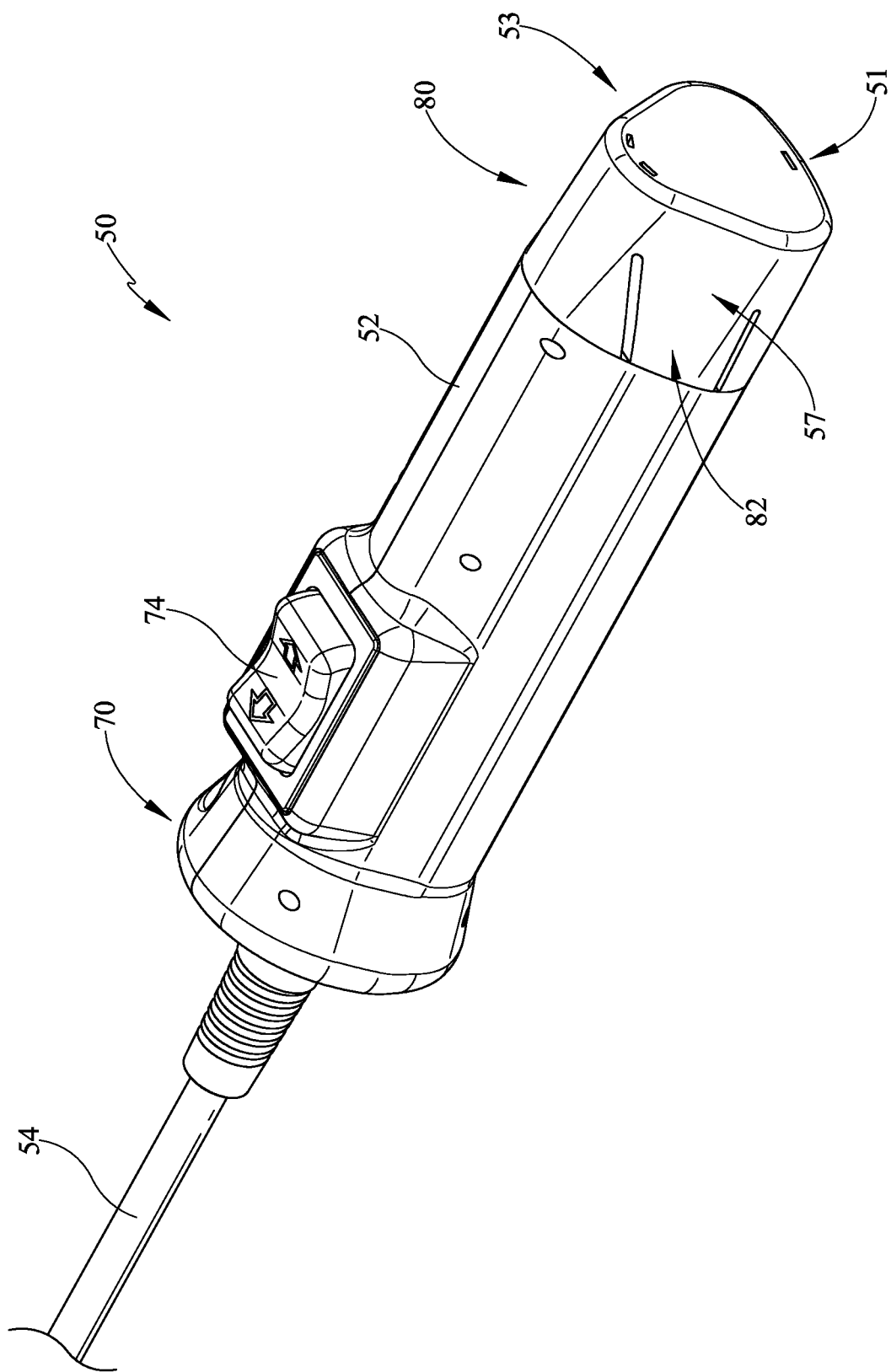
FIG. 4 is a perspective view of a power wand housing.
Figure 5:
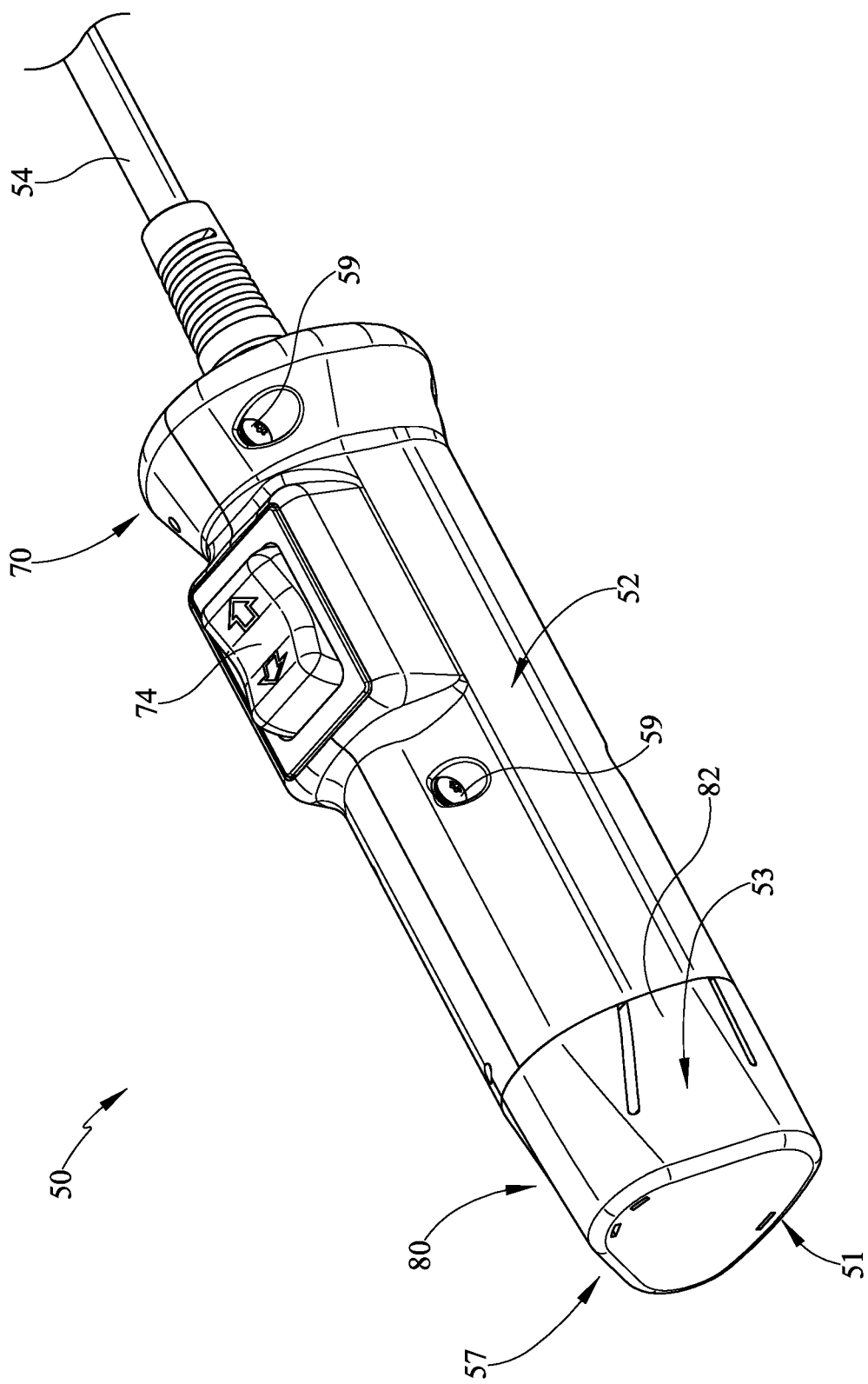
FIG. 5 is a second perspective view of the power wand housing.

With reference now to FIGS. 4 and 5, the power wand 50 is shown in perspective view with a portion of the wiring 54 removed. The housing 52 has been previously described as being triangular in shape. While the instant views of FIGS. 4 and 5 provide aid in depicting such shape of the housing 52, the housing may be formed of various alternate shapes. As shown in the views, the three sides 51, 53, 57 are shown with respect to the battery pack 80. Each of the sides 51, 53, 57 extends from the battery pack 80 along a longitudinal direction of the housing 52. The battery pack 80 and the housing 52 are shown having a substantially same cross-sectional shape. However, in other embodiments, it is within one of ordinary skill in the art to provide a housing wherein the removable battery pack 80 may have a different cross-sectional shape from the housing 52. The sides 51, 53, 57 are joined by curved segments to define the generally triangular shape. However, the triangular shape comes from the use of three batteries within the removable battery pack 80. The use of the battery pack 80 allows for change in polarity to vary the driving direction of the awning motor 21 by actuating the switch 74. The battery pack 80 is also shown having two detents 82 on sides 53, 57 so that the battery pack 80 may be easily removed. Although not shown, a detent 82 may also be located on side 51. Further, while the detents 82 are shown for actuation on the battery pack 80, it is within scope of the present embodiments that the detents 82 may be moved to the housing 52 and actuated thereon so as to allow release of the battery pack 80.

Also shown in FIGS. 4 and 5 are fasteners 59 which are used to fasten the housing 52 and retain the housing segments together. Various methods of fastening the housing 52 together may be utilized if a housing 52 is formed of two or more segments. The instant fastener location and design may be altered and still be within the scope of the instant embodiments.

Figure 6:
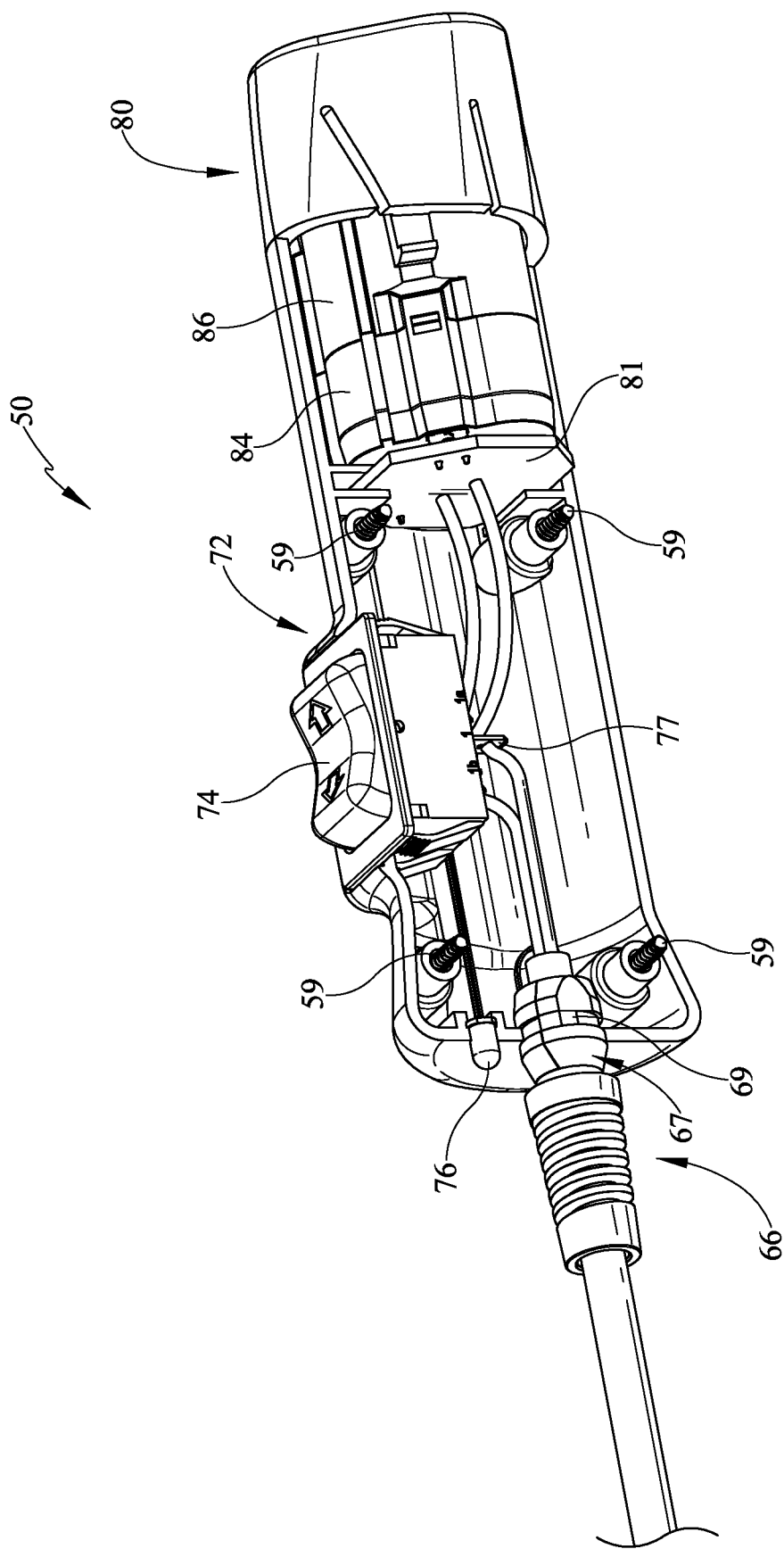
FIG. 6 is a perspective view of the power wand with a portion of the housing removed to reveal a housing interior.
Figure 7:
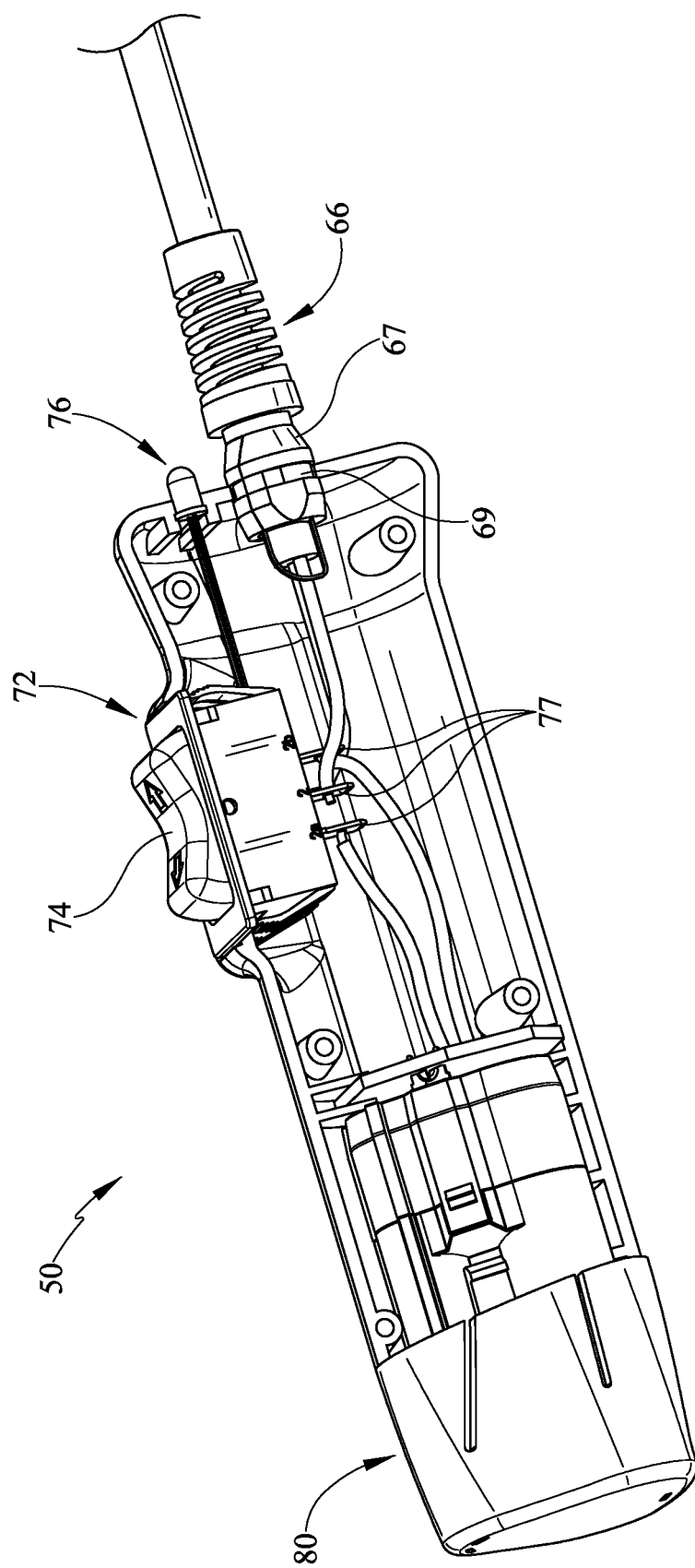
FIG. 7 is a perspective view of the power wand with an opposite portion of the housing removed relative to FIG. 6 to reveal the housing interior.

With reference now to FIGS. 6 and 7, the power wand 50 is shown with a portion of the housing 52 removed to reveal the interior of the power wand 50. The forward end of the housing 52 reveals the method of installation of the strain relief 66. Each strain relief 66 includes a node 67 with a groove 69. Within the groove 69, an edge of the housing 52 may be seated. When both portions of the housing 52 are connected together, the groove 69 is substantially captured in the housing 52 such that the node 67 cannot be moved in a longitudinal direction into or out of the housing 52. The strain relief 66 spring portion may extend from the node 67 so that the structure is held in place and the conductors 56, 58 extend through the wiring 54 through the strain relief 66 and into the housing 52 through the node 67. Also shown about the strain relief 66 above the node 67 is the LED 76. Various forms of illumination may be utilized but the LED 76, as previously described, allows for illuminating the area near the power connector 42 or other area that the user desires for illumination. Further, once connected to the awning power connector 42, the LED 76 may be utilized to illuminate other areas during the operation for example so that a user can watch the awning assembly extend or retract and check the hardware or other mechanisms which are moving during such movement.

The switch 74 is shown disposed within the mount 72. The present switch 74 has a normal position and two spring-biased positions which provide for movement of the awning motor 21 and power by the battery pack 80. The switch 74 includes a module having a number of blades 77 which are in electrical communication with the battery pack 80. Longitudinally rearward from the strain relief 66 from the switch 74 is a printed circuit board 81 which may provide a terminal (not shown) for connection with the battery pack 80. The printed circuit board 81 is shown and has electrical connection to a male or female terminal 84. The battery pack 80 includes the other of a female or male terminal 86 to provide the requisite connection. The conductors 56, 58 may extend to the two blades 77 of the switch 74 and onto the printed circuit board 81 for powering. Other embodiments of a switch may be utilized as well.

Referring now to FIG. 8, a schematic electrical diagram is depicted which shows the electric operation of the device. Generally, the battery pack 80 is shown at the left hand end and is depicted in electrical communication with the printed circuit board 81 for electrical communication between the battery pack 80 and the remainder of the circuit. To the left of the printed circuit board 81, are wires extending to the switch 74. The switch 74 includes four blades 77 for connection of the wires coming from the power supply of the battery pack 80 and wires coming from the awning motor 21. The two wires extending from the switch 74 to the right are conductors 56, 58. The conductors 56, 58 are shown within a broken line box indicating the conduit 54. The connector 60 is shown adjacent to the conductors 56, 58 and shown schematically for connection with the awning power connector 42, which is in wired electrical communication with the awning motor 21. The wiring 23 which extends between the awning motor 21 and the awning power connector 42, may be disposed in a cable or conduit and may extend through the hardware assembly 24, for example through the first arm 28 and through the second arm 30 out to the awning bar 30 (FIG. 1).

The battery pack 80 may be defined by one or more batteries which may be of various types of rechargeable or non-rechargeable form. For example, the battery pack 80 may be defined by lithium ion, nickel metal hydride, nickel cadmium or other lithium or nickel based batteries or still other rechargeable power sources.

Additionally, or alternatively, the wand 50 may include a wired power connector in electrical communication with the printed circuit board 81. The connector may receive either a permanent or temporary connection with the printed circuit board 81 and may be powered by either a DC source or an AC source, as shown in balloon with the illustrative examples of DC and AC connectors 85, 87. The wire extending from the circuit board 81 to the connectors 85, 87 may be connected to the wand by a connector. The connectors 85, 87 may also be used as an alternative to charge the at least one battery 80. Or as previously discussed, the at least one battery 80 may be removable to also facilitate charging. Still further, where necessary, such as when AC power is utilized, the wand 50 may further comprise a transformer for example to convert the AC power to DC for charging of the at least one battery 80. In other embodiments, a wall-wart may be used to house the AC-DC converter and remove this structure from within the housing. Still further, the connectors 85, 87 may also be used to power the motor 21 when the battery voltage is insufficient to power the motor 21.

Also, a battery protection circuit, designed for the battery chemistry used, may be integrated into the battery pack 80. This circuit protects the battery pack from overcharging and/or overheating during operation and charging. The protection circuit protects the battery pack 80 from over charge release, over discharge prohibition, over discharge release, short circuit protection, and excess current protection.

The power wand 50 may also be used to power other accessories on the awning including LED light strips, fans, spotlights and speakers. This may be accomplished through the use of multiple jacketed cables or a multi-conductor cable and connector rather than the two-conductor and two-place connector shown in FIG. 8. The use of one or more additional switches to control these accessories may also be employed on the power wand 50.

Figure 9:
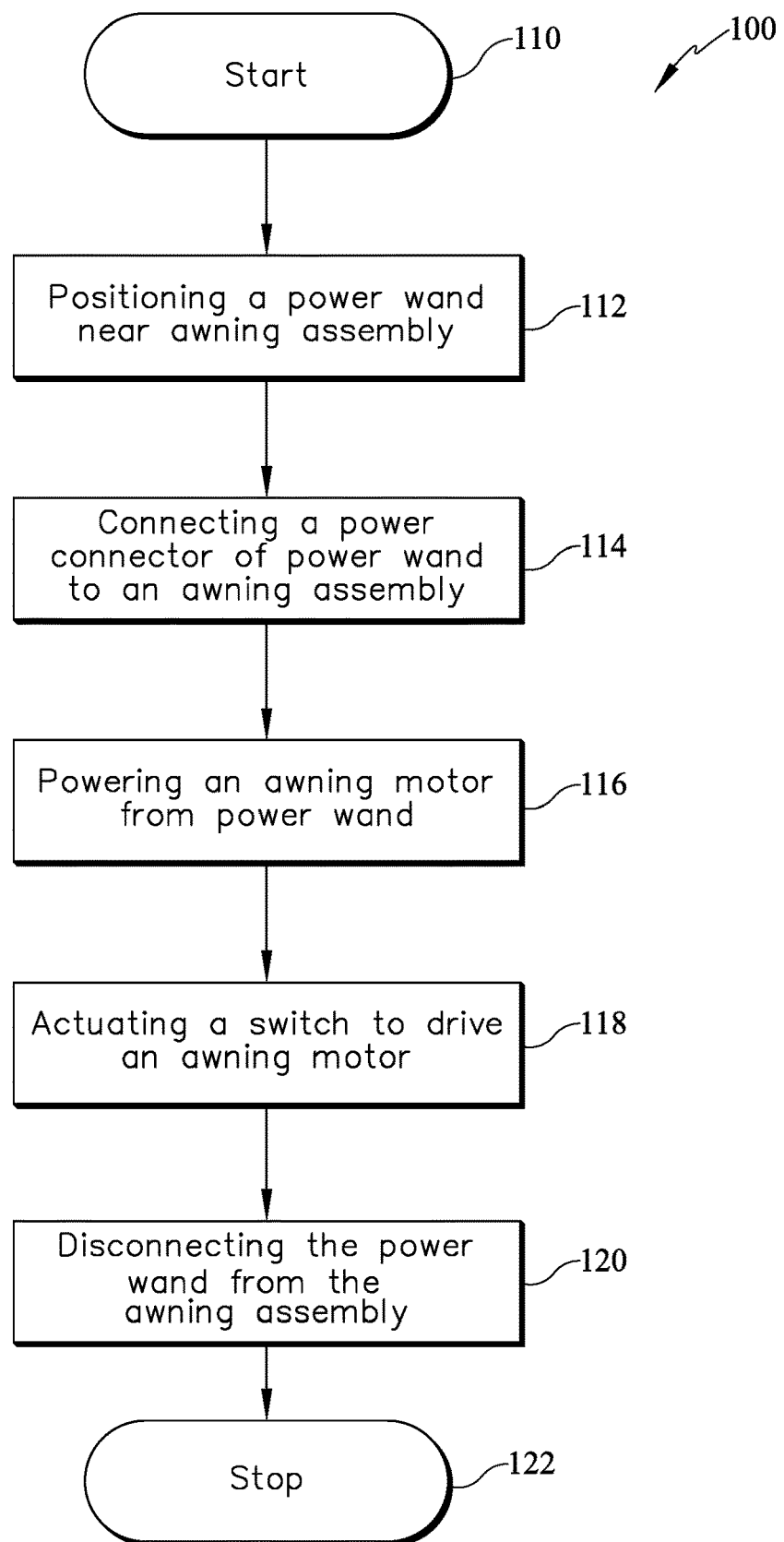

Referring now to FIG. 9, a flow chart is shown having a method 100 of operating an awning assembly 20 with a power wand 50. To start 110 the method 100, the power wand 50 is moved near the awning assembly 20 at step 112. Next the power wand connector 60 is connected at step 114 to the awning assembly 20. The awning power connector 42 may be located at the bottom of the hardware as shown in FIG. 1 or may be shown in a raised position as shown in FIG. 11. In such embodiment, therefore, it may be desirable that the wand have a rigid jacket or conduit associated with the wiring to support overhead use.

Next, the awning is powered by the power wand 50 at step 116. This may occur by having charged batteries in the wand 50 to provide power to the motor 21. This may also be a distinct step from or simultaneous with step 118 wherein the switch 74 is actuated to direct movement of the motor 21.

Finally, once the awning is either retracted or extended to a desired position, the power wand 50 may be disconnected at step 120 from the awning assembly 20. Once complete, the power wand 50 may be stored until needed again or left connected to the awning assembly if desirable. The process is stopped at step 122.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A power wand in combination with an awning assembly, comprising:
   said awning assembly having:
      an awning hardware, an awning canopy extending between portions of the awning hardware, an awning motor to extend or retract the awning canopy toward or away from a wall to which said awning assembly is mounted;
   said power wand having:
      a housing having a first multi-sided cross-sectional shape and being free of a motor to operate the awning assembly, an opening at a major longitudinal end of said housing;
      a battery pack having a second multi-sided cross-sectional shape, wherein an outer periphery of the first multi-sided cross-sectional shape is substantially the same as an outer periphery of the second multi-sided cross-sectional shape;
      said battery pack which is partially positioned in said housing and removably engages said housing, said battery pack and at least one rechargeable battery configured to be inserted into and removed from said opening at said major longitudinal end of the housing and in a major longitudinal direction of the housing;
      said at least one rechargeable battery disposed within said battery pack, said at least one rechargeable battery being capable of powering operation of said motor of said awning assembly;
      wiring in electrical communication with said at least one rechargeable battery;

a connector capable of being connected and disconnected to the awning assembly for electrical communication to drive extension or retraction of said awning motor in the awning assembly to move said awning canopy toward or away from said wall upon which said awning assembly is mounted; and, a switch on said housing to actuate said awning assembly, and further comprising a strain relief extending from said housing.

2. The power wand in combination with an awning assembly of claim 1, said connector capable of electrical communication with the awning motor.

3. The power wand in combination with an awning assembly of claim 1, said wiring extending through said strain relief.

4. The power wand in combination with an awning assembly of claim 1, said switch defining a direction control for the awning motor.

5. The power wand in combination with an awning assembly of claim 1 further comprising a connector for recharging in said at least one rechargeable battery.

6. The power wand in combination with an awning assembly of claim 1 further comprising a charging connector for powering said power wand.

7. The power wand in combination with an awning assembly of claim 1, said battery pack having a detent to engage and disengage said housing.

8. The power wand in combination with an awning assembly of claim 1 wherein conductors extend through a vertical member of said awning hardware and are in electrical communication with said awning motor.

9. A power wand in combination with an awning assembly, comprising:
   said awning assembly having:
      an awning hardware, an awning canopy extending between portions of the awning hardware, an awning motor to extend or retract the awning canopy toward or away from a wall to which said awning assembly is mounted;
   said power wand having:
      a housing having a multi-sided cross-sectional shape and defining a grip portion, said housing being free of a motor;
      a battery pack having a substantially matching cross-sectional shape about said multi-sided cross-sectional shape of said housing, said battery pack removably engaging and at least partially received by said housing via an opening at a major longitudinal end of said housing and being removable in a major longitudinal direction from said opening;
      at least one rechargeable battery located in said battery pack, and a recharging connector to charge said at least one rechargeable battery in said battery pack;
      wiring in electrical communication with said battery pack and extending from said housing;
      a strain relief extending from said housing;
      a connector engaging said wiring and in electrical communication with said at least one rechargeable battery;
      a switch in electrical communication with said battery pack and the awning motor of the awning assembly which is electrically communicating with said switch when said connector is connected to said awning assembly, said switch configured to operate said awning motor to extend or retract the awning canopy outwardly from the wall.

10. The power wand in combination with an awning assembly of claim 9, said connector being an electrical quick connector.

11. The power wand in combination with an awning assembly of claim 9, wherein said connector is spaced from said housing.

12. The power wand in combination with an awning assembly of claim 11, said connector being spaced by said wiring.

13. A method of powering an awning structure, the method comprising:
   providing the power wand in combination with the awning assembly of claim 1;
   positioning the power wand near said awning assembly;
   connecting the power wand to said awning assembly;
   powering the motor of the awning assembly from said power wand; and,
   directing movement of said motor of the awning assembly with said power wand.

14. The method of claim 13 further comprising grasping said power wand.

15. The method of claim 13 further comprising actuating the switch to direct said awning motor.

16. The method of claim 13 further comprising removing said at least one battery.

17. The method of claim 13, disconnecting said power wand from said awning assembly when said directing movement is complete.

* * * * *